United States Patent [19]

Grant

[11] 4,166,241
[45] Aug. 28, 1979

[54] BATTERY JUMPERING APPARATUS

[76] Inventor: Thomas J. Grant, Rte. 6, Box 489, Hot Springs, Ark. 71901

[21] Appl. No.: 901,288

[22] Filed: May 1, 1978

Related U.S. Application Data

[63] Continuation-in-part of Ser. No. 785,660, Apr. 7, 1977, abandoned.

[51] Int. Cl.² .................. H02J 7/00; H01R 11/00
[52] U.S. Cl. .............................. 320/25; 320/2; 339/29 B
[58] Field of Search ........................ 320/2-4, 320/25, 26, 48; 339/29 B

[56] References Cited

U.S. PATENT DOCUMENTS

| | | | |
|---|---|---|---|
| 2,659,042 | 11/1953 | Anderson et al. | 320/48 X |
| 3,051,887 | 8/1962 | Lind | 320/25 |
| 3,257,602 | 6/1966 | Potter et al. | 320/2 X |
| 3,281,816 | 10/1966 | Raymond | 320/25 |

Primary Examiner—Robert J. Hickey
Attorney, Agent, or Firm—Koenig, Senniger, Powers and Leavitt

[57] ABSTRACT

Apparatus for jumpering a first battery to a second battery. First and second jumper cables are connected to terminals of the batteries, each jumper cable being connected between corresponding polarity battery terminals to form an electrical path therebetween. A normally open set of contacts of a relay are series-connected with one of the jumper cables to hold the circuit path between the batteries open while the cables are being connected. This prevents the creation of sparks at the terminals of either battery. The relay is energized after the cables are connected to close the contacts and complete the circuit path between the batteries whereby one of the batteries may supply power to a load normally supplied by the other battery. The set of contacts are enclosed to prevent any sparks created during closure of the contacts from igniting any gases generated by the batteries. The relay is deenergized before the cables are disconnected from the respective battery terminals to open the circuit between the batteries so that the cables can thereafter be disconnected from the terminals without creating sparks at the battery terminals.

5 Claims, 7 Drawing Figures

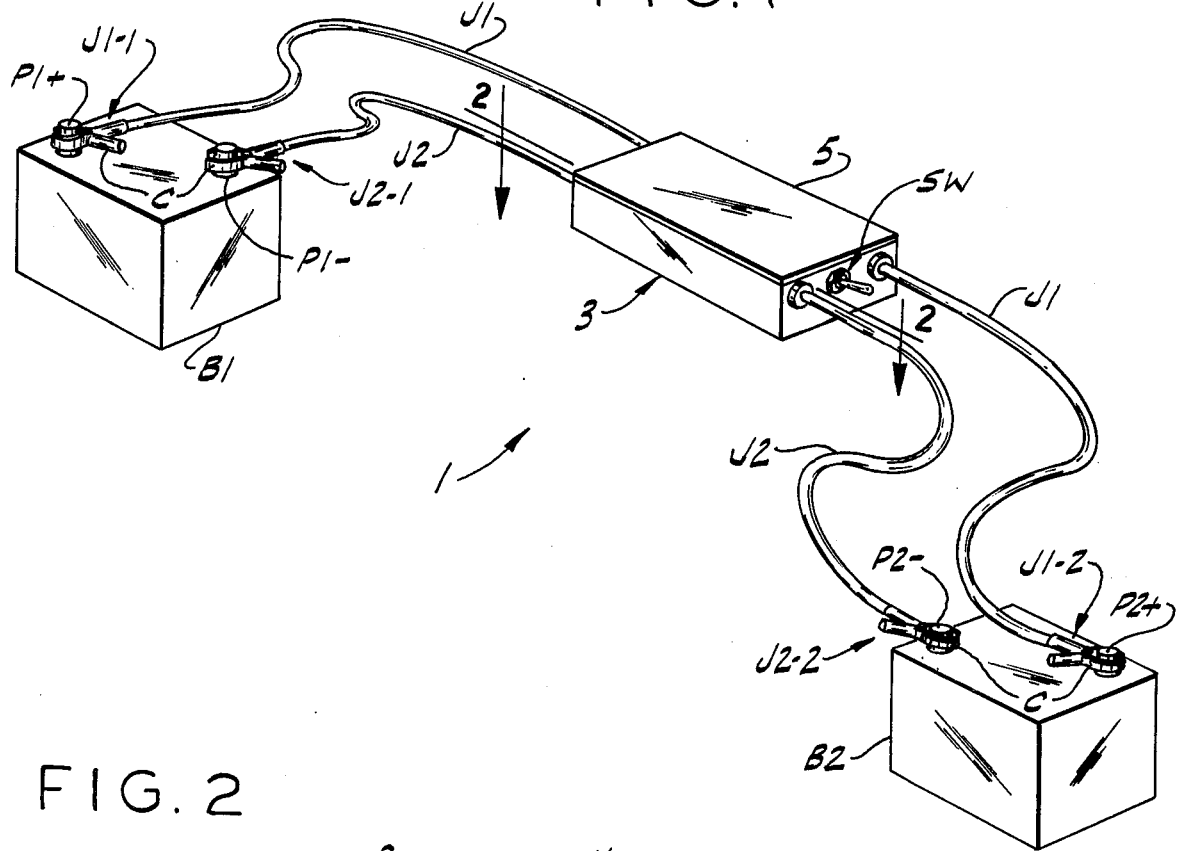
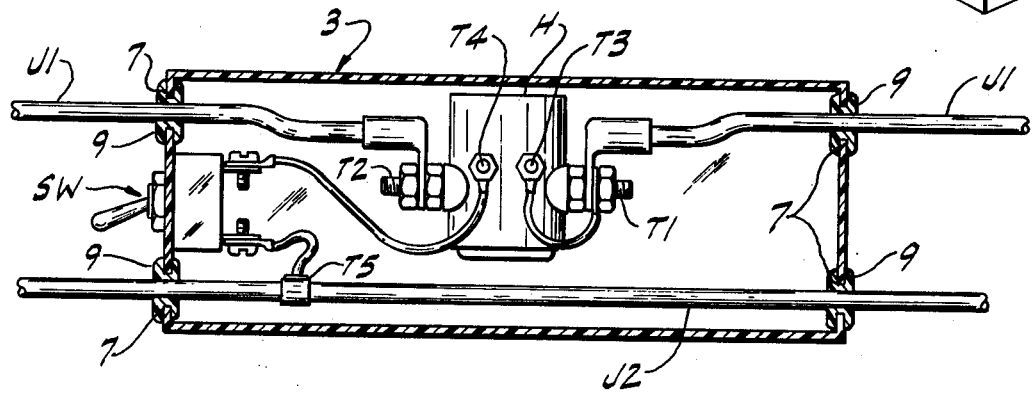
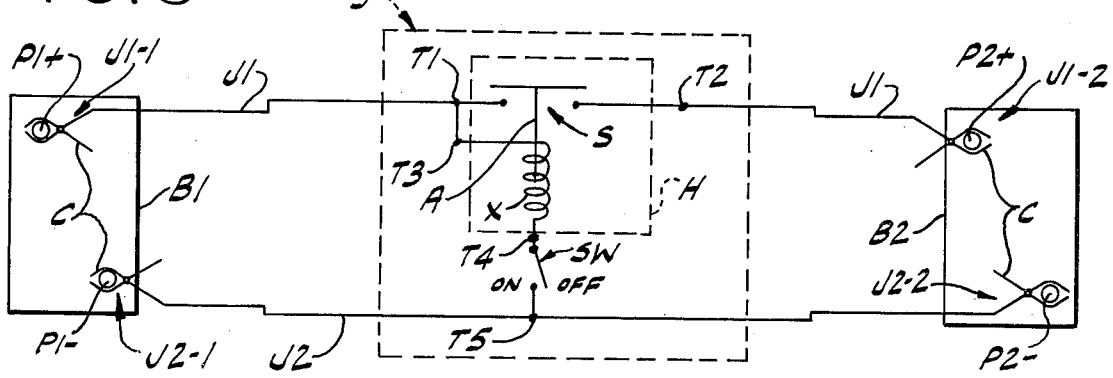

F I G. 6
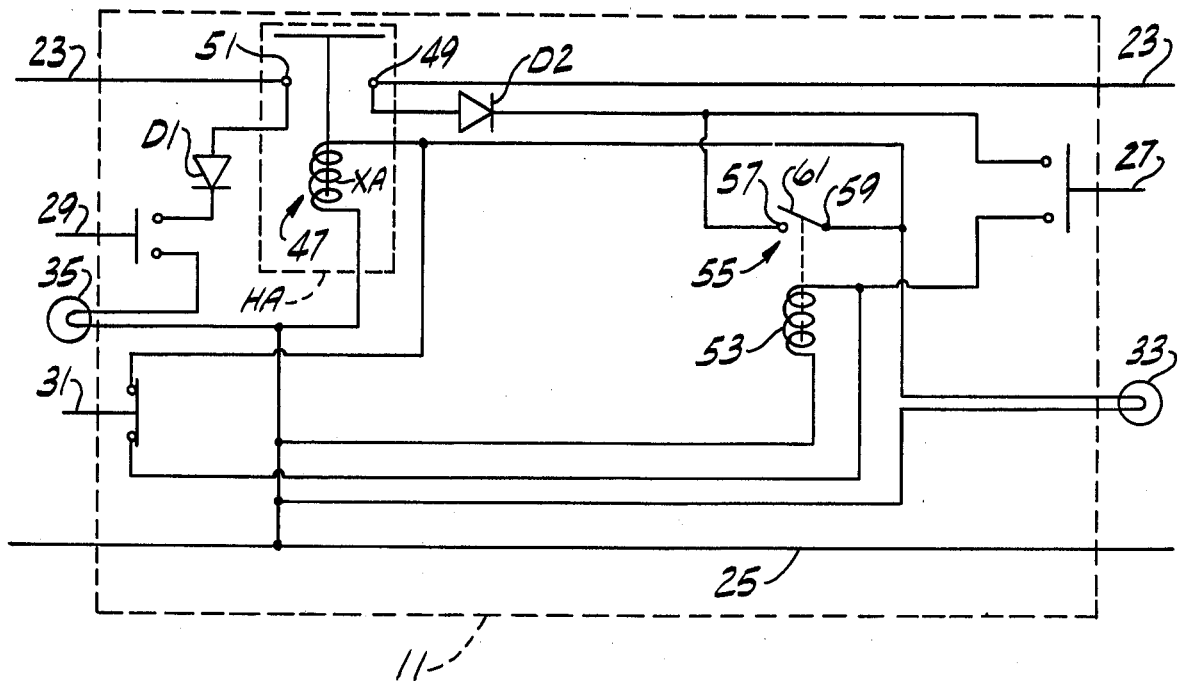

BATTERY JUMPERING APPARATUS

CROSS-REFERENCE TO RELATED APPLICATION

This application is a continuation-in-part of my copending U.S. application Ser. No. 785,660 filed Apr. 7, 1977, now abandoned.

BACKGROUND OF THE INVENTION

This invention relates to interconnecting power supplies and more particularly to apparatus for jumpering batteries.

Lead-acid batteries of the type commonly found in automobiles and other vehicles internally generate hydrogen and oxygen gases (at the plates of the batteries) which are highly explosive. Care must be taken to keep flames, sparks, etc. away from such a battery since an explosion resulting from the combustion of these gases may rupture the battery container causing electrolyte (sulphuric acid and water) to be sprayed or spilled over nearby people or objects with potentially harmful consequences. A common situation in which the danger of explosion arises is when a battery in one automobile is jumpered to a discharged battery in another automobile so the latter vehicle may be started. Jumper cables are typically used for jumpering batteries and hook-up procedures have been recommended to reduce the danger of creating sparks at a battery terminal. It has been further recommended that one of the jumper cables have an in-line switch which is open while the cables are being connected and closed only after all connections are made. While such a switch may reduce the danger of sparks being created while a hook-up is made, sparks may occur when the switch itself is closed and opened and these sparks may ignite the gases and cause and explosion.

SUMMARY OF THE INVENTION

Among the several objects of the present invention may be noted the provision of apparatus for quickly and easily jumpering a charged battery to a discharged battery; the provision of such apparatus in which the batteries are jumpered without the danger of igniting gases generated by either battery; the provision of such apparatus in which the danger of igniting gases generated by either battery after the batteries are jumpered is eliminated; and the provision of such apparatus which is easy to install, simple to operate and low in cost.

Briefly, apparatus of the present invention for jumpering a first battery to a second battery comprises first and second jumper cables which are connected to terminals of the batteries, each jumper cable being connected between corresponding polarity battery terminals to form an electrical path therebetween. A jumper relay has a normally open set of contacts series-connected with one of the jumper cables and the normally open contacts hold the circuit path between the batteries open while the cables are being connected thereby to prevent the creation of sparks at the terminals of either battery. The jumper relay is energized after the cables are connected to close the contacts and complete the circuit path between the batteries whereby one of the batteries may supply power to a load normally supplied by the other battery. The jumper relay is deenergized before the cables are disconnected from the respective battery terminals to open the jumper relay contacts and the circuit between the batteries. The set of contacts are enclosed to prevent any sparks created during closure or opening of the contacts from igniting any gases generated by the batteries.

Other objects and features will be in part apparent and in part pointed out hereinafter.

BRIEF DESCRIPTION OF THE DRAWINGS

FIG. 1 is a perspective view of two batteries jumpered by apparatus of the present invention;

FIG. 2 is a cross-section of apparatus of the present invention taken along line 2—2 in FIG. 1;

FIG. 3 is a schematic circuit diagram of apparatus of the present invention;

FIG. 6 is a schematic circuit diagram of the alternative embodiment shown in FIG. 4.

Corresponding reference characters indicate corresponding parts throughout the several views of the drawings.

DESCRIPTION OF A PREFERRED EMBODIMENT

Figure 4:
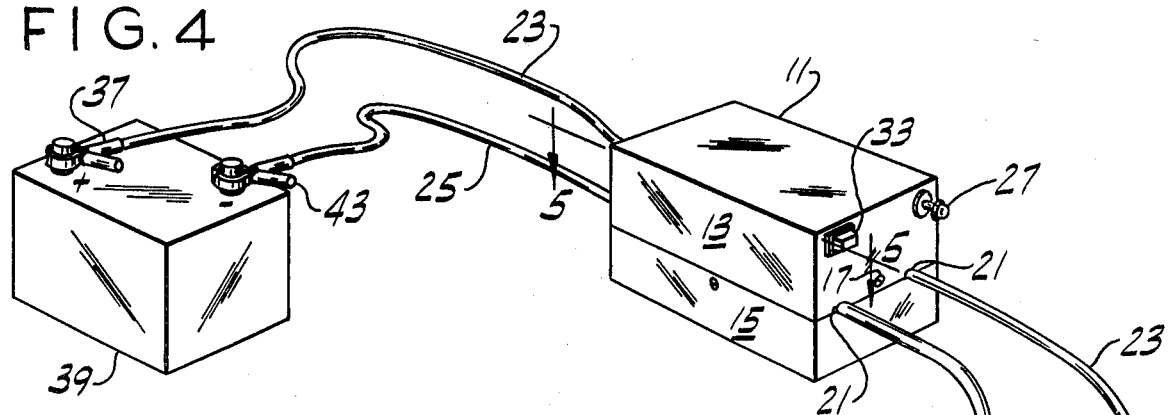
FIG. 4 is a perspective view of two batteries jumpered by an alternative embodiment of the apparatus of the present invention.
Figure 4A:
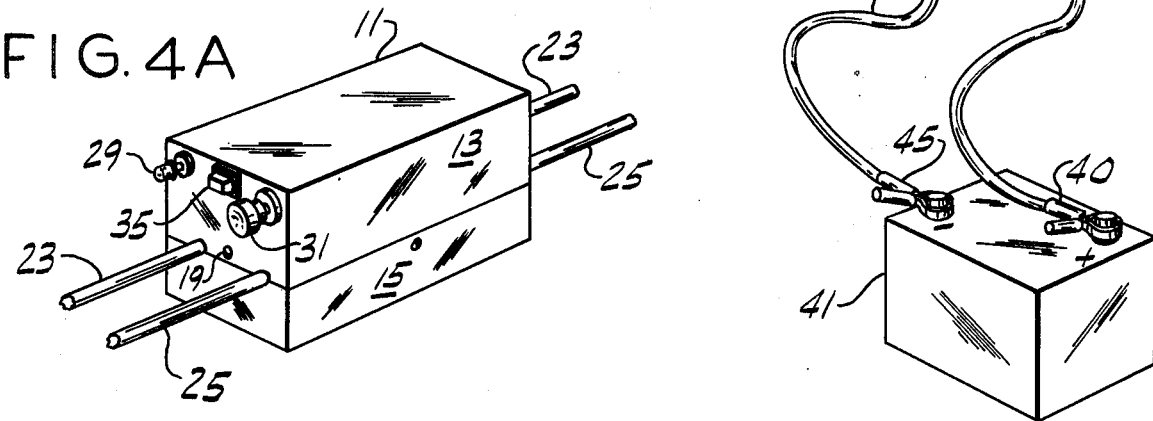
FIG. 4A is a perspective view of a portion of FIG. 4 showing the end of a portable case of the present invention not visible in FIG. 4.

Referring now to the drawings, apparatus of the present invention for jumpering a first battery B1 to a second battery B2 is indicated in its entirety at 1 and comprises first and second jumper cables J1 and J2 respectively. Each end of the jumper cables is terminated in a clamp C or other suitable connector for connection of the cables to terminals or posts P of the batteries. Each jumper cable is connected between corresponding polarity terminals of the batteries to form an electrical path between the batteries. Thus, for example, jumper cable J1 is connected between a terminal P1+ of battery B1 and a terminal P2+ of battery B2 while jumper cable J2 is connected between a terminal P1− of battery B1 and a terminal P2− of battery B2. When jumpered together in this manner, batteries B1 and B2 are connected in parallel.

A jumper relay, generally designated R, has a normally open set S of contacts (FIG. 3) series-connected with one of the jumper cables, i.e., cable J1. This set of contacts holds the circuit path between the batteries open while cables J1 and J2 are connected to the batteries. Because no circuit path between the batteries can be completed while the jumper cables are being connected, no sparks are created at the terminals of either battery which may ignite potentially explosive hydrogen and oxygen gases generated by the batteries. Thus, the danger of a potentially harmful explosion is minimized during a jumpering operation.

Relay R has a coil X (FIG. 3) connected across the positive and negative terminals of battery B1 and a two-position switch SW is connected in series with the relay coil. Although switch SW is shown in FIGS. 1 and 2 as a toggle switch, it will be understood that any suitable switch may be used. This switch is closed after cables J1 nd J2 are connected to the batteries to energize relay R. As shown in FIG. 3, the circuit path to energize coil X is from terminal P1+ of battery B1, through the coil of the relay and switch SW to terminal P1— of battery B1. When coil X is energized the relay contacts are bridged by movement of an armature A of the relay and the electrical path between the batteries is closed.

The relay coil and set of contacts are installed in a housing H which encloses the set of contacts to prevent any sparks created during closure of the contacts from igniting any gases generated by the batteries. Suitable electrical connectors T extend through the relay housing for making the appropriate connections between the relay and the cables. Thus jumper cable J1 is connected to a pair of relay terminals T1 and T2 to series connect the relay contacts with the cable and relay coil X is connected between jumper J1 and one side of switch SW via a pair of terminals T3 and T4 respectively. The other side of switch SW is connected to jumper cable J2 at a terminal T5.

The relay and switch are mounted in a portable case 3 which is made of wood, plastic or other suitable material. Polypropylene is an excellent material for case 3. The case has a removable cover 5 for providing access to the relay and the switch. Switch SW is mounted on one side of the case for easy access when the jumper cables are being installed between batteries. The case further has jumper cable access openings 7 through which cables J1 and J2 are routed into the case. A grommet 9, which constitutes means for sealing openings 7 around cables J1 and J2, may be fitted in each opening to provide a seal so that the relay and switch are not exposed to dangerous gases and dampness when cover 5 is in place. Thus, case 3 constitutes means for preventing exposure of contacts S to any gases generated by batteries B1 and B2 and for confining to its interior any sparks created when the circuit path between batteries B1 and B2 is completed. Of course, housing H can also constitute such means if it is sufficiently leak-proof and spark-proof.

The procedure for using apparatus 1 of the invention is as follows: Prior to making any connection to a battery terminal with a jumper cable, switch SW is placed to its OFF or contact opening position. This opens the circuit path through cable J1. Next, assuming battery B2 is discharged or dead, end J1-2 of jumper cable J1 is connected to post P2+ of battery B2 and end J1-1 of the cable is then connected to terminal P1+ of battery B1. Next, end J2-1 of cable J2 is connected to post P1— of battery B1 an lastly, end J2-2 of the cable is connected to post P2— of battery B2. After all the connections have been made, switch SW is placed to the ON position. This completes the circuit path to energize coil X and close the relay contacts which, in turn, completes the electrical path between the batteries. To remove the jumpers from between the batteries, switch SW is first moved to the OFF position. This is because sparks may be generated when the cable clamps are removed from the battery terminals, the same as when they are connected. The cables are then disconnected by removing in sequence: end J2-2 of cable J2 from terminal P2— of battery B2, end J2-1 of cable J2 from terminal P1— of battery B1, and J1-1 of cable J1 from terminal P1+ of battery B1 and end J1-2 of cable J1 from terminal P2+ of battery B2.

It will be understood that apparatus 1 of the invention may be permanently connected between two batteries and coil X and a switch so connected between the positive and negative terminals of the batteries that power from either battery could energize the relay when the switch is closed to parallel the batteries so one battery supplies power to a load normally supplied by the other battery.

There is shown in FIG. 4 an alternative embodiment of portable case 3, the alternative embodiment being designated by the reference numeral 11. Case 11 is preferably made of polypropylene, but can be made of any other suitable lightweight, durable, insulative material. The walls of the case 11 are approximately 0.1 in. (0.254 cm.) thick. It has a removable cover 13 which is secured to a base 15 by means of two screws 17 and 19 and jumper cable access openings 21 through which pass two jumper cables, designated in this embodiment by the reference numerals 23 and 25. Cables 23 and 25 fit relatively tightly in openings 21. Disposed on the ends of cover 13 are three nonlocking, pushbutton switches 27, 29 and 31, and two lamps 33 and 35.

An end 37 of jumper cable 23 is connected to the positive terminal of a dead battery 39 while the other end 40 of jumper cable 23 is connected to the positive terminal of a charged battery 41. One end 43 of jumper cable 25 is connected to the negative terminal of battery 39 while the other end 45 is connected to the negative terminal of battery 41.

Inside case 11 there is a jumper relay, indicated at 47, having a set of normally open contacts 49 and 51 (FIG. 6), which contacts are series-connected with jumper cable 23. Normally open contacts 49 and 51 hold the circuit between batteries 39 and 41 open while ends 37, 40, 43 and 45 of cables 23 and 25 are being connected to the corresponding terminals of the batteries, thereby preventing the creation of sparks at said terminals.

Portable case 11 is disposed a substantial distance along cables 23 and 25 from ends 37, 40, 43 and 45, preferably at least 1.5 feet (45.7 cm.) from the closest end. Cables 23 and 25 are sufficiently long, e.g., 10 feet (304.8 cm.), to permit contacts 49 and 51 to be spaced from batteries 39 and 41. This is an additional safety feature of the present invention. The circuit is closed between the batteries somewhere other than at the battery terminals and that place of circuit closure is spaced at least a predetermined distance from the batteries to ensure that gases generated thereby are not ignited.

Figure 5:
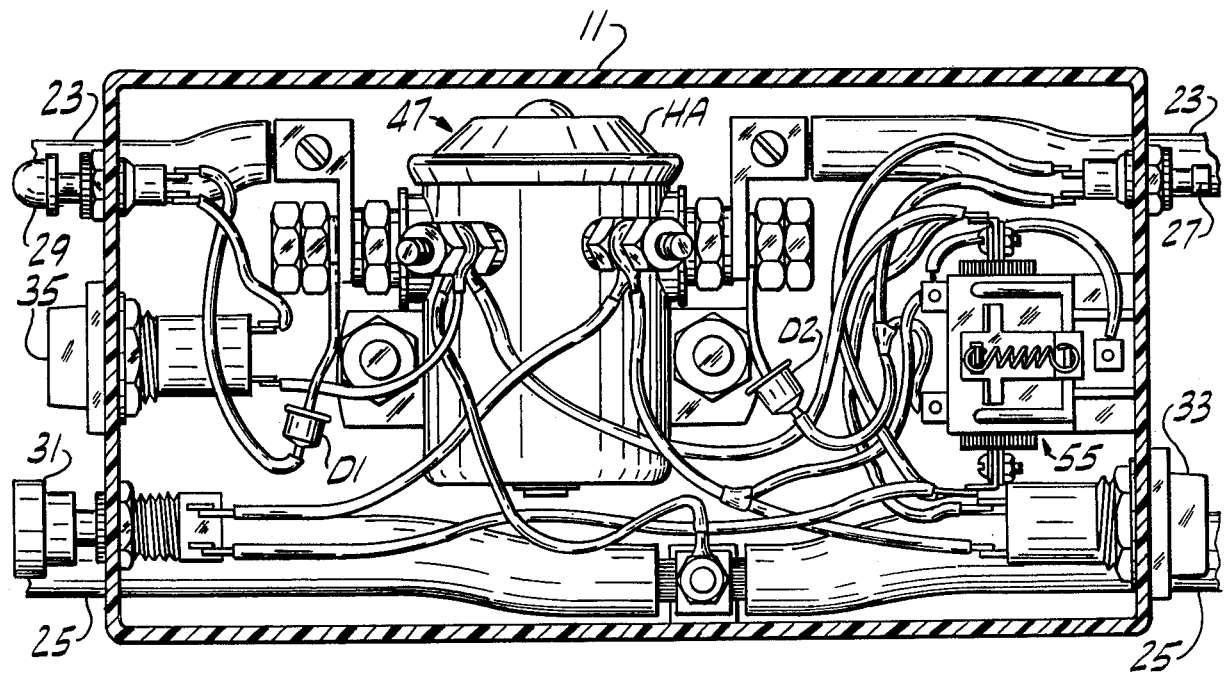
FIG. 5 is a horizontal section generally along line 5—5 of FIG. 4.

The apparatus of FIG. 5 includes a polarity indicator circuit consisting of a diode D1, normally open switch 29 and lamp 35. When using the apparatus of FIG. 5, the user first secures end 37 to the positive terminal of battery 39 and then secures end 43 to the negative terminal of that battery. To check to see is he or she has attached the ends to the proper terminals, the user presses switch 29. If the polarity is proper and the battery has not been discharged below some minimal level, e.g., 3 volts, lamp 35 will light because current flows from the positive terminal of battery 39 through diode D1, switch 29 and lamp 35 to the negative terminal of battery 39. If the polarity is reversed, however, diode D1 is reversed biased and no current will flow through lamp 35.

After ensuring that cables 23 and 25 are connected to the proper terminals of battery 39, the user secures end 40 of cable 23 to the positive terminal of battery 41 and then secures end 45 of cable 25 to the negative terminal of that battery. To energize relay 47, and thereby close the circuit between batteries 39 and 41, the user closes switch 27. Switch 27, which constitutes means for initiating the energization of relay 47, is connected through jumper cable 23 and a diode D2 to the positive terminal of battery 41 and through a coil 53 of a single-pole, single-throw holding circuit relay 55 and jumper cable 25 to the negative terminal of battery 41. Relay 55 has a set of normally open contacts, the contacts of that set being designated 57 and 59. Closure of switch 27 causes current to flow through coil 53, thereby energizing relay 55. This moves an armature 61 to close contacts 57 and 59.

The closing of armature 61 closes a shunt circuit in parallel with switch 27. Even if switch 27 subsequently opens, relay 55 remains energized because the energizing current for coil 53 can flow through the contacts of relay 55 and normally closed switch 31 to the coil.

The closing of armature 61 closes a circuit through a coil XA of relay 47, thereby energizing it and completing the circuit between batteries 39 and 41. Thus, holding circuit relay 55 constitutes means for maintaining energization of relay 47. Contact 57 is conductively connected to jumper cable 23 through diode D2 and contact 59 is conductively connected to coil XA of relay 47. Therefore, current for coil XA does not flow through initiating switch 27 but rather flows directly from diode D2 through contacts 57 and 59 and armature 61 to coil XA. The closing of armature 61 also causes lamp 33 to light since lamp 31 is connected between contact 59 and jumper cable 25. Thus, lamp 33 provides an indication that the circuit path between the batteries is closed.

Note that the closing of the circuit between batteries 39 and 41 takes place inside a housing HA (FIG. 5) which is itself mounted inside case 11. Housing HA and case 11 together constitute means for preventing any sparks created during closure of contacts 49 and 51 from igniting any gases generated by batteries 39 and 41. Of course, if housing HA is sufficiently leak-proof and spark-proof, it by itself constitutes such means.

After jumpering battery 39, the user safely breaks the circuit between batteries 41 and 39 by opening normally-closed switch 31. Switch 31 constitutes means for deenergizing relay 47 to open the circuit between batteries 39 and 41 before cables 23 and 25 are disconnected. Opening switch 31 breaks the circuit between jumper cable 23 and coil 53 of relay 55 thereby deenergizing relay 55. Armature 61 thereupon opens, breaking the circuit between cable 23 and coil XA, and thereby deenergizing relay 47. The opening of armature 61 also removes power from lamp 33. thus, opening switch 31 deenergizes relays 47 and 55. Note that switch 31 is part of the parallel circuit that shunts switch 27 and it is in series with contacts 57 and 59 and with coil 53. When relay 47 is deenergized, the circuit through contacts 49 and 51 is broken. Any sparks thereby created are contained within housing HA and case 11. Removal of jumper cables 23 and 25 from the terminals of batteries 39 and 41 is then accomplished without the danger that sparks might be created near the batteries. The user can readily tell if the circuit between the batteries has been broken, thereby eliminating the danger of sparking at the battery terminals, by observing lamp 33. If lamp 33 is lit, the cables should not be removed from the battery terminals; if lamp 33 is not lit, the cables can safely be removed.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for jumpering a first battery to a second battery comprising:

first and second jumper cables the ends of which are adapted for connection to terminals of the batteries, each jumper cable being connected between corresponding polarity battery terminals to form an electrical path therebetween;

a jumper relay having a normally open set of contacts series-connected in the first jumper cable, said normally open contacts holding the circuit path between the batteries open while the cables are being connected thereby to prevent the creation of sparks at the terminals of either battery;

means for energizing the jumper relay after the cables are connected to close the jumper relay contacts and complete the circuit path between the batteries whereby one of the batteries may supply power to a load normally supplied by the other battery, said jumper relay energizing means including switch means for initiating the energization of said jumper relay and means connected to the initiating switch means for maintaining energization of the jumper relay;

means connected to the maintaining means for deenergizing the jumper relay to open the jumper relay contacts and open the circuit between the batteries before the cables are disconnected from their respective battery terminals; and portable case means enclosing the energizing means for preventing exposure of the jumper relay contacts to any gases generated by the batteries and for confining to the interior of said case means any sparks generated when the circuit path is completed.

2. Apparatus as set forth in claim 1 wherein the maintaining means includes a holding circuit relay having at least one set of normally open contacts, one contact being conductively connected to the first jumper cable and the other contact of that set being conductively connected to the coil of the jumper relay, and wherein the initiating switch means includes a normally open switch connected between the first jumper cable and the coil of the holding circuit relay, whereby the closure of the initiating switch causes the holding circuit and jumper relays to be energized.

3. The apparatus as set forth in claim 2 wherein the maintaining means further includes a normally open shunt circuit in parallel with the initiating switch between the first jumper cable and the coil of the holding circuit relay, said shunt circuit including one set of normally open contacts of the holding circuit relay whereby when the holding circuit relay is energized the shunt circuit closes thereby keeping the holding circuit relay energized even if the initiating switch is opened.

4. The apparatus as set forth in claim 3 wherein the deenergizing means includes a normally closed deenergizing switch series-connected in the shunt circuit whereby the opening of the deenergizing switch breaks the circuit between the first jumper cable and the coil of the holding circuit relay when the initiating switch is open thereby deenergizing both the holding circuit relay and the jumper relay.

5. The apparatus as set forth in claim 4 wherein the same set of contacts completes the shunting circuit and the circuit between the first jumper cable and the coil of the jumper relay, and wherein the deenergizing switch is series-connected between the shunting circuit contacts and the coil of the holding circuit relay.

* * * * *